(12) United States Patent
Szuster

(10) Patent No.: US 8,082,949 B2
(45) Date of Patent: Dec. 27, 2011

(54) NON-RETURN VALVE WITH A BALL-SHAPED VALVE BODY

(75) Inventor: Mroslaw Szuster, Biala (PL)

(73) Assignee: Przedsiebiorstwo Inzynierii Srodowiska, Koszalin (PL)

( * ) Notice: Subject to any disclaimer, the term of this patent is extended or adjusted under 35 U.S.C. 154(b) by 389 days.

(21) Appl. No.: 12/224,186

(22) PCT Filed: Feb. 27, 2007

(86) PCT No.: PCT/PL2007/000008
§ 371 (c)(1),
(2), (4) Date: Dec. 15, 2008

(87) PCT Pub. No.: WO2007/097651
PCT Pub. Date: Aug. 30, 2007

(65) Prior Publication Data
US 2009/0145496 A1    Jun. 11, 2009

(30) Foreign Application Priority Data
Feb. 27, 2006   (PL) .......................... 379053

(51) Int. Cl.
*F16K 15/00*   (2006.01)
(52) U.S. Cl. ................. 137/614.2; 137/533.11
(58) Field of Classification Search ............ 137/614.2, 137/613, 533.11
See application file for complete search history.

(56) References Cited

U.S. PATENT DOCUMENTS

| | | | |
|---|---|---|---|
| 1,674,879 A | 6/1928 | Atkinson | |
| 1,749,098 A | 3/1930 | Boosey | |
| 2,103,427 A | 12/1937 | Long | |
| 3,741,243 A | 6/1973 | Deibler et al. | |
| 4,422,472 A * | 12/1983 | Klein | 137/614.2 |
| 4,687,023 A | 8/1987 | Harbison et al. | |
| 5,709,242 A | 1/1998 | Bergen | |

FOREIGN PATENT DOCUMENTS

| | | |
|---|---|---|
| DE | 3010527 A1 | 10/1981 |
| GB | 436 806 A | 10/1935 |
| WO | WO 96/12129 | 4/1996 |
| WO | WO 02/31390 | 4/2002 |
| WO | WO 02/31391 | 4/2002 |
| WO | WO 2006/123959 | 11/2006 |

OTHER PUBLICATIONS

Fabryka Armatur Jafar Sa: "Ball check valve elbow szuster system," http://www.jafar.com.pl/images/download/katalog/zwrotne/karty/6001_6011.pdf [retrieved Sep. 9, 2009].
International Search Report for PCT International Application No. PCT/ PL2007/000008, published Aug. 30, 2007.
International Search Report issued by the International Searching Authority (ISA/EP) on Sep. 19, 2006 in connection with International Application No. PCT/PL2006/00033.

(Continued)

*Primary Examiner* — Kevin Lee
(74) *Attorney, Agent, or Firm* — Gary J. Gershik; Cooper & Dunham LLP

(57) ABSTRACT

In the non-return valve of this invention, at its outlet there is a blade gate (1) and at least a part of the body (2) makes for a uniform cast of the valve body (3).

7 Claims, 2 Drawing Sheets

OTHER PUBLICATIONS

Figure 1:
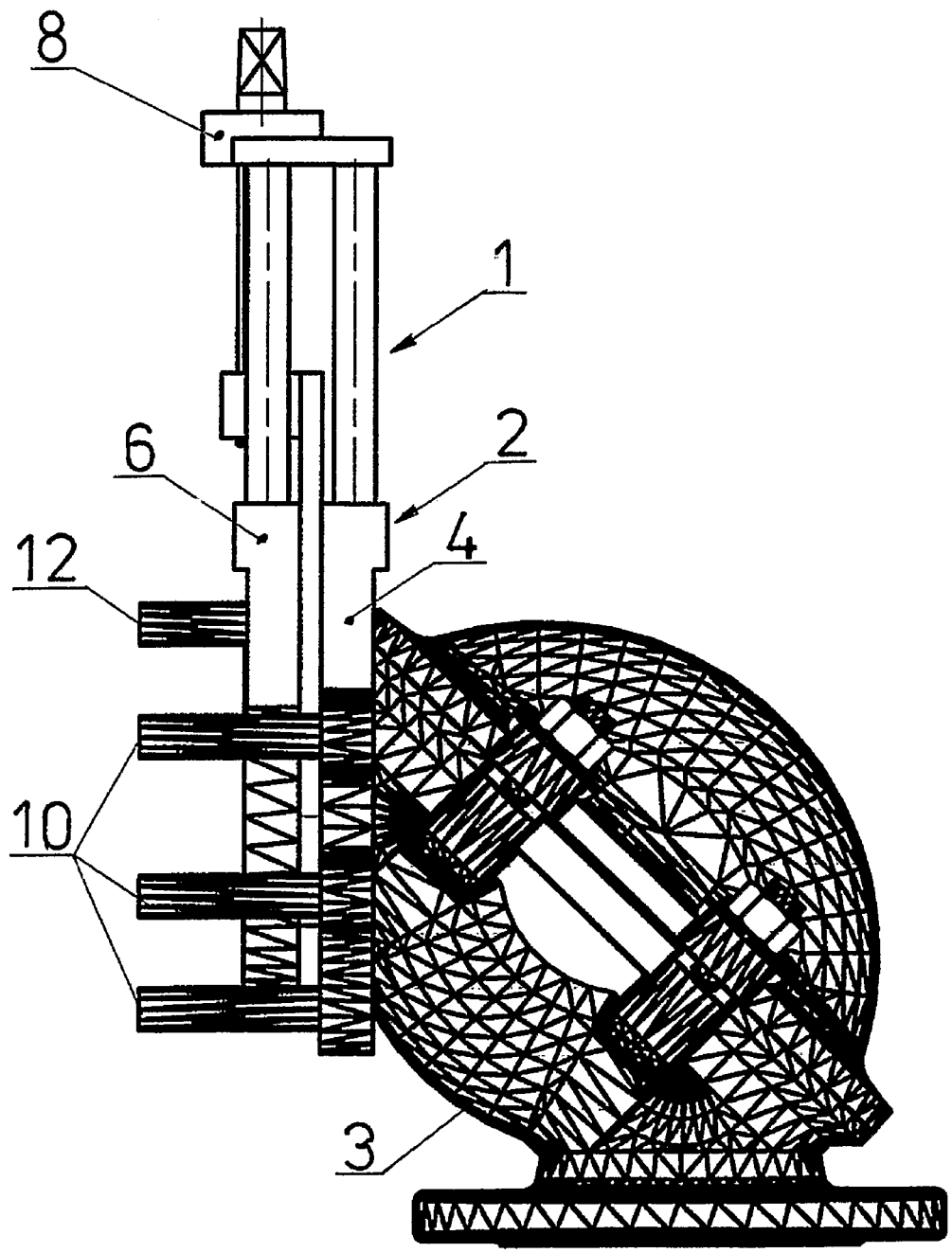

Office Action issued Sep. 11, 2009 in connection with U.S. Appl. No. 11/920,529.

Mar. 11, 2010 Amendment in Response to Sep. 11, 2009 Office Action in connection with U.S. Appl. No. 11/920,529, filed Nov. 15, 2007.

Jul. 21, 2010 Final Office Action issued in connection with U.S. Appl. No. 11/920,529, filed Nov. 15, 2007.

Amendment in Response to Jul. 21, 2010 Final Office Action submitted Jan. 19, 2011 in connection with U.S. Appl. No. 11/920,529, filed Nov. 15, 2007.

\* cited by examiner

NON-RETURN VALVE WITH A BALL-SHAPED VALVE BODY

This application is a §371 National Stage of PCT International Application No. PCT/PL2007/000008, filed Feb. 27, 2007, claiming priority of Polish application No. P-379053, filed Feb. 27, 2006 the contents of which are hereby incorporated by reference into this application.

BRIEF SUMMARY OF THE INVENTION

The invented object is a non-return valve with a ball-shaped valve body specifically meant for pumping systems of faecal and non-faecal waste water. Furthermore, it can be applied at other pumping installations both on the pressure and suction side, for drinking and industrial water, as well as in water and pneumatic transport.

BACKGROUND OF THE INVENTION

It is known from the submitted Polish P-343136 invention titled non-return valve with a ball closing element, whose body is equipped with a through-channel together with an inlet and outlet terminated With a ring seat, on which the closing ball element is settled in the closing position, as well as it is equipped with a deflected channel, whose diameter is greater than the diameter of
the closing ball element, which it enters while the valve is in open position. By the inlet, in the place of junction between the deflected channel and the through-channel, the body has an extended flow cross-section. The valve deflected channel has a blind with a through hole connected with the outlet of the through-channel,
settling the closing ball element in a fully open position, while the through-channel is in a form of an elbow or knee. This valve can be produced in three basic versions with respect to the fixing point of the blind with the through hole. The blind can be permanently fixed to the elbow-shaped guiding rail of the cover or of the cleaning
cover or to the deflected channel of the valve body. In the invention known from the submitted Polish patent application P-343137, the non-return valves with a ball-shaped body have some improvements in form of a resistance seat made of an unfinished ring or in a form of two incomplete ring crescents. The idea of these valves is essentially based upon tight separation of the lower pressure section on the upper side of deflected area, which prevents liquid flow through the deflected channel at fully open position of the valve, reducing the flow resistance coefficient of the ball at it fully open position.

DETAILED DESCRIPTION OF THE INVENTION

Due to the fact that normally a closing element is installed behind the non-return ball valve, most commonly a soft seal gate or a blade gate, it is important that together with the non-return ball valves they constitute a set which is immune to getting clogged with solid particles and to their erosive influence. This especially applies to elbow-shaped non-return valves, behind which a diversification of the flow speed occurs in the pipe cross-section. Application of soft seal blades in this case involve quite significant risk, due to the possibility of faster wear of the rubber wedge surface and its vibration, as they are normally fixed in a way which causes the largest flow speed to be directed on the wedge bottom while the valve is open. Besides, the soft seal gate length for the most commonly used valve diameters is few times bigger than the length of the blade gate cover, which is very important in case of their covering on a horizontal pipe in waste water pumping stations, where the compact size of pumping installation is vital in narrow containers. The use of blade gates for waste water is limited due to a their higher price. Non-return elbow-shaped ball valves could be installed in the place of an existing elbow, but then there is no room for covering the gate and it is necessary to modify the pumping pipeline.

As a result of the performed durability tests together with a projection of ball position in the valve during the flow and examinations performed in terms of compactness of the pumping installation construction and elimination of ball vibration, a new valve construction has been developed on basis of the invention for virtually all conditions of liquid flow through a fully opened valve, as well as of the influence of flow cutting closing element upon the possible sedimentation of solid particles on the elements of the non-return valve body and on the elements of the closing organ.

The non-return valve according to the invention is characterized in that there is a blade gate at its outlet and at least its body is cast uniformly with the valve body.

The uniform cast together with the valve body constitutes a plate inlet segment of the divided blade gate body together with a through hole positioned perpendicularly to the vertical axis.

As an advantage, the gate body contains a plate inlet segment, uniformly cast with the valve body together with a properly shaped through-hole positioned perpendicularly to the vertical axis, as well as a plate outlet segment, which are connected with each other separably with bolt elements and separated from each other with an edge seal.

A power unit with a closing plate is fixed to the plate, inlet segment and to the plate outlet segment.

As an advantage, the plate inlet segment has double-sided bolts fixed inside it.

The inlet plate segment can have a recess.

As an advantage, the plate outlet segment has double-sided bolts fixed inside it.

As a basic advantage of the invention, it simplifies the structure of pumping installations of a waste water pumping station with a closing organ located especially on a horizontal part of the pumping pipeline. Besides, it can be contained in casing dimensions just as a standard elbow-shaped non-return ball valve, which significantly reduces the length of a non-return valve together with the gate and lowers its production costs.

The invention is presented on examples, whereas

FIG. 1 presents the valve according to the invention in a lateral view, while

Figure 2:
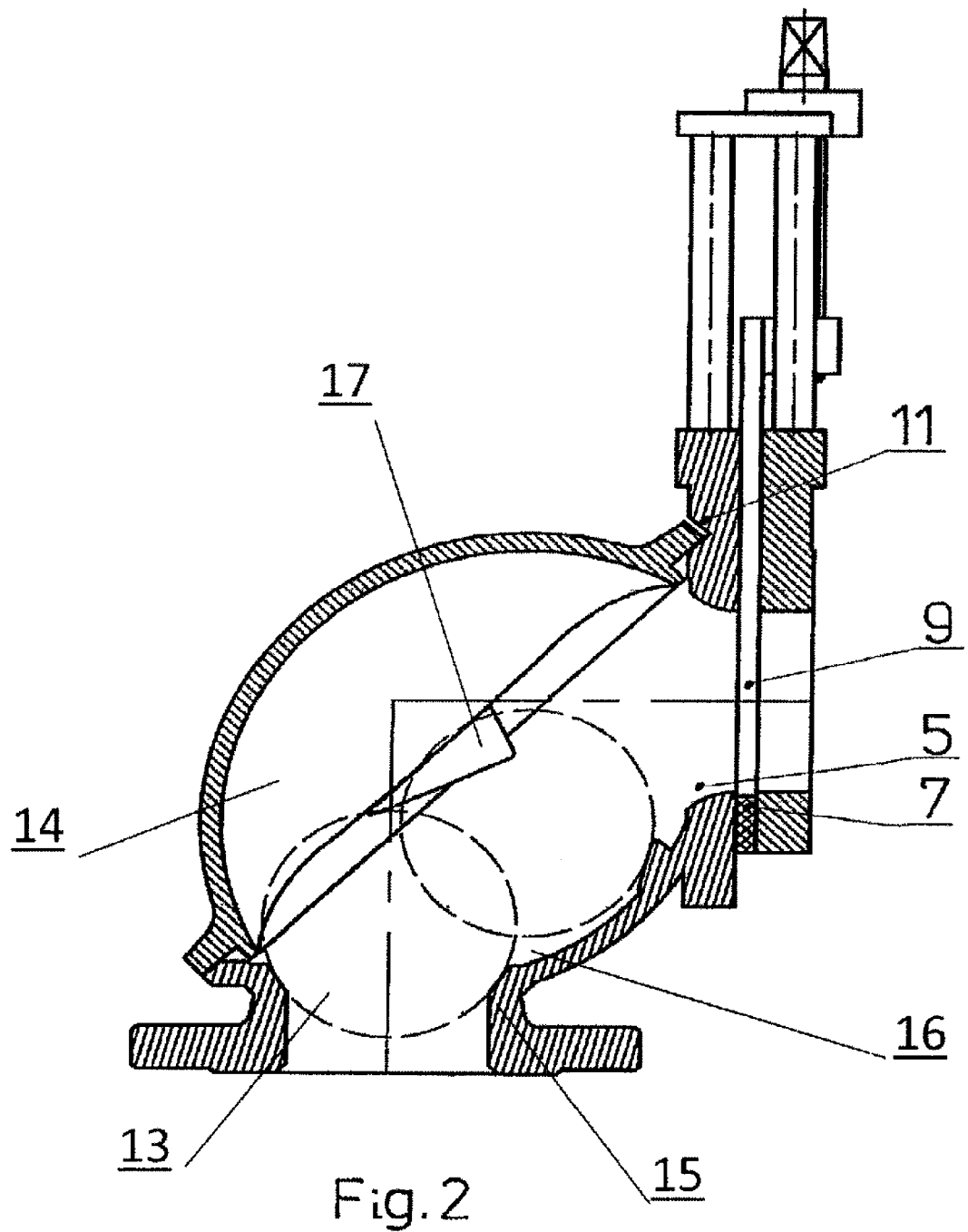

FIG. 2 presents the valve according to the invention in a longitudinal cross-section through its body and the plate outlet segment.

According to the invention, the non-return valve comprises a ball (13) and a valve body (3) having a through channel (14) which forms a bend or elbow, and which has a blade gate on its outlet (1), whose body (2) was cast uniformly with the valve body (3). The non-return valve has an inlet which is fitted with a ring seat (15) on which the ball is settled in the valve's closed position, a deflected channel (16) with a diameter greater than the ball diameter into which the ball enters in the open valve position, and a blind (17) positioned within the deflected channel, the blind having a through opening linked with the outlet of the deflected channel, wherein the blind settles the ball in the valve's fully open position. As an advantage, the blade gate (1) body (2) contains a plate inlet segment (4), cast uniformly with the valve body (3) together with a properly shaped through-hole (5) positioned perpendicularly to the vertical axis, and a plate outlet segment (5), as well as a plate outlet segment (6), which are connected with each other separably with bolt elements not shown in the picture, and separated from each other with an edge seal (7). A power unit (8) with a closing plate (9) is attached to the plate inlet segment (4) and to the plate outlet segment cutting the liquid flow through the valve. The plate inlet segment (4) can include fixed double-sided bolts. The plate inlet segment (4) has a recess meant for the valve cover (11). Plate outlet segment (6) can include fixed double-sided bolts (12).

The solutions known from the state-of-art have not been presented in detail in the picture, as for example the compression gland of the closing plate (9).

The above example does not exhaust all the valve options of design and application according to the invention.

The invention claimed is:

1. A non-return valve comprising:
   a. a ball;
   b. a valve body comprising
      (i) a through-channel which forms a bend or elbow;
      (ii) an outlet;
      (iii) an inlet fitted with a ring seat on which the ball is settled in the valve's closed position;
      (iv) a deflected channel with a diameter greater than the ball diameter into which the ball enters in the open valve position, wherein at the inlet, at the junction of the deflected channel and the through-channel, the body has an extended flow cross section;
      (v) a blind positioned within the deflected channel having a through opening linked with the outlet of the deflected channel, wherein the blind settles the ball in the valve's fully open position; and
   c. a blade gate (1) at the outlet of the valve body, wherein the blade gate has a body (2) which is cast uniformly with the valve body (3).

2. The valve according to claim 1, wherein the valve body (3) comprises a plate inlet segment (4) of the blade gate (1) body (2) together with a through-hole (5) positioned perpendicularly towards the vertical axis.

3. The valve according to claim 1, wherein the blade gate body (2) comprises a plate inlet segment (4) uniformly cast with the valve body (3), wherein a through-hole (5) is positioned perpendicularly to the vertical axis, and wherein a plate outlet segment (6), is separably connected to the plate inlet segment with bolt elements and an edge seal (7) which is positioned between the plate inlet segment and the plate outlet segment.

4. The valve according to claim 3, wherein a power unit (8) with a closing plate (9) is fixed to the plate inlet segment (4) and to the plate outlet segment(6).

5. The valve according to claim 2, wherein the plate inlet segment (4) has double-sided bolts (10) fixed inside the plate inlet segment (4).

6. The valve according to claim 5, wherein the plate inlet segment (4) has a recess (11).

7. The valve according to claim 3, wherein the plate outlet segment (6) has double-sided bolts (12) fixed inside the plate outlet segment (6).

* * * * *